US006810305B2

(12) United States Patent
Kirkpatrick, Jr.

(10) Patent No.: US 6,810,305 B2
(45) Date of Patent: Oct. 26, 2004

(54) OBSTRUCTION MANAGEMENT SYSTEM FOR ROBOTS

(75) Inventor: James Frederick Kirkpatrick, Jr., Johnson City, TN (US)

(73) Assignee: The Procter & Gamble Company, Cincinnati, OH (US)

( * ) Notice: Subject to any disclaimer, the term of this patent is extended or adjusted under 35 U.S.C. 154(b) by 191 days.

(21) Appl. No.: 09/785,357

(22) Filed: Feb. 16, 2001

(65) Prior Publication Data

US 2002/0116089 A1 Aug. 22, 2002

(51) Int. Cl.[7] ............................................... G06F 19/00
(52) U.S. Cl. .................. 700/245; 318/568.12; 318/581; 318/586; 318/587; 701/23; 701/24; 701/25; 180/167; 180/169; 180/6.5; 340/988
(58) Field of Search .......................... 700/245; 318/587, 318/568.12, 581; 701/23, 24, 25; 180/167, 169, 6.5; 340/988

(56) References Cited

U.S. PATENT DOCUMENTS

| | | | |
|---|---|---|---|
| 2,770,074 A | | 11/1956 | Jones |
| 3,952,361 A | | 4/1976 | Wilkins |
| 4,674,048 A | | 6/1987 | Okumura |
| 4,707,297 A | * | 11/1987 | Paske et al. ................ 180/211 |
| 5,109,566 A | | 5/1992 | Kobayashi et al. |
| 5,144,715 A | * | 9/1992 | Matsuyo et al. ............... 706/13 |
| 5,277,839 A | * | 1/1994 | Schultz .................. 318/568.12 |
| 5,293,955 A | | 3/1994 | Lee |
| 5,451,135 A | * | 9/1995 | Schempf et al. ............ 180/211 |
| 5,815,880 A | | 10/1998 | Nakanishi |
| 5,903,124 A | | 5/1999 | Kawakami |
| 5,942,869 A | | 8/1999 | Katou et al. |
| 5,974,347 A | | 10/1999 | Nelson |
| 5,995,884 A | * | 11/1999 | Allen et al. ................. 340/436 |
| 6,076,025 A | | 6/2000 | Ueno et al. |
| 6,076,226 A | | 6/2000 | Reed |
| 6,076,227 A | * | 6/2000 | Schallig et al. ............. 250/253 |
| 6,119,057 A | | 9/2000 | Kawagoe |
| 6,338,013 B1 | * | 1/2002 | Ruffner ....................... 701/23 |

FOREIGN PATENT DOCUMENTS

| | | |
|---|---|---|
| EP | 0 786 229 A2 | 7/1997 |
| JP | 99178764 A | 7/1999 |
| JP | 99178765 A | 7/1999 |

OTHER PUBLICATIONS

DOE, Innovative thechnology, 1999, Internet, pp. 1–33.*
Battlebots Sanfrancisco, Team SL.A..M, 2000, pp. 1–10.*
Team toad: Las Vegas 2000 BBots competition, pp. 107.*
Gomes et al., Vaccum cleaning robot, 1995, Internet, pp. 1–14.*

(List continued on next page.)

*Primary Examiner*—William A. Cuchlinski, Jr.
*Assistant Examiner*—McDieunel Marc
(74) *Attorney, Agent, or Firm*—Larry L. Huston; Leonard W. Lewis; Steven W. Miller

(57) ABSTRACT

A system for mobile robots to detect obstructions. Obstructions include objects which may impair the or impede the mobility of the robot, as well as transitions from carpeted surfaces to hard surfaces, transitions from hard surfaces to carpet, or transitions between other types of flooring. The system includes a plow which may move underneath the obstruction, The obstruction may the be brushed aside, or rise to an elevation detectable by the robot. Upon detection, the robot may change its direction of movement or stop moving altogether.

16 Claims, 2 Drawing Sheets

OTHER PUBLICATIONS

Indoor Environmental Solution, Inc., Deluxe cleaning robot, 1998, Internet pp. 1–2.*

A. Holenstein et al., "Collision Avoidance In A Behavior–Based Mobile Robot Design", Proceedings of the International Conference on Robotics and Automation, Sacramento, Apr. 9–11, 1991, vol. 1, No. Conf. 7, Apr. 9, 1991, pp. 898–903, XP000218429, Institute of Electrical and Electronics Engineers.

R. Hinkel et al., "An Application For A Distributed Computer Architecture–Realtime Data Processing In An Autonomous Mobile Robot", International Conference On Distributed Computing Systems, San Jose, Jun. 13–17, 1988, pp. 410–417m XP000040240, Institute of Electrical And Electronics Engineers.

* cited by examiner

OBSTRUCTION MANAGEMENT SYSTEM FOR ROBOTS

FIELD OF THE INVENTION

The present invention is directed to mobile robots and more specifically to systems therefore which prevent mobile robots from being immobilized by or venturing past given obstructions.

BACKGROUND OF THE INVENTION

Mobile robots have many applications in the home and industry. By mobile it is meant that the robot may move from one location to another. Upon or by moving between locations, the robot may transmit signals, such as sound, infra-red reception, video images, bomb detection, etc. to a remote location. A human operator may be disposed at the remote location, or the signal may be stored for subsequent retrieval. The mobile robot may patrol a given area for intruder detection or may clean a specific surface area, such as a carpet or a hard surface floor.

Carpeting and rugs are inclusive of woven and other fabric sheet goods intended for flooring without regard to pile or loop. Hard surface floors include, but are not limited to, hardwood, concrete, ceramic tile, vinyl, synthetic composition tile, linoleum, and smooth mats and laminates.

In the home, office and elsewhere hard surface floors are frequently adjacent to carpeted areas. Furthermore, homes often have hard surface floors with throw rugs thereon. A hard surface floor care robot mobilely performs maintenance and cleaning of such a floor, including mopping, polishing, dusting, waxing, etc. Such a robot should not go onto carpeted surfaces or the throw rugs while applying cleaning fluids, polish, oiled dusting cloths, wax etc. intended for the hard surface, otherwise damage to the carpet or throw rug may result. Conversely, cleaning solutions intended to be applied to carpeting or a rug may damage a hard surface floor. Traditional barriers such as walls and doors can not be depended upon to prevent hard surface care robots from moving onto a carpet or throw rug or vice versa.

Furthermore, a robot may be immobilized by a carpet or throw rug. The wheels and traction of a robot designed for mobility on a hard surface may be insufficient to propel the same robot across a carpet or throw rug. Furthermore, the robot may become trapped by the carpet, or more likely the throw rug, if the leading edge of the robot should move underneath and lift the carpet or throw rug.

Carpeting, throw rugs, and other barriers which may immobilize the robot or be damaged by the robot while it is in use are collectively referred to hereinafter as obstructions. An obstruction is a any obstruction in the path of the robot which may immobilize the robot, unduly restrict its movement, or be damaged by the robot performing its intended task.

U.S. Pat. No. 4,977,639 (Takahashi et al.) discloses a contact carpet sensor used in a manual vacuum cleaner to stop the brush from rotating on hard surface floors. The sensor consists, in part, of a narrow contact element which sinks into carpet but is supported on hard surface floors relative to a broader contact element. The '639 patent teaches that the carpet is sensed only after the vacuum cleaner crosses the transition from hard surface to carpet or vice versa. The '639 patent relies on carpet being substantially more penetrable than a hard surface, which may not be the case with tightly woven rugs. Further, this teaching provides no suggestion of how to avoid obstructions such as throw rugs which may immobilize the robot.

U.S. Pat. No. 5,144,715 (Matsuyo et al.) discloses vacuum cleaner dust pick-up dynamics used to determine floor type. Dust is removed from hard surface floors suddenly upon the application of the air flow while dust more gradually is vacuumed from carpet. This difference in air flow is detected with optical sensors. The '715 patent is directed specifically to vacuum cleaners and the sensor reports a transition only after it has crossed a transition in the floor type.

U.S. Pat. No. 5,277,839 (Shultz et al.) discloses a permanent fluorescent dye material for establishing a guide path on the carpet for an automatic guided vehicle. The dye material fluoresces when exposed to ultraviolet light but is otherwise invisible. Lines drawn with the dye on carpet can be used to optically guide a vehicle. U.S. Pat. No. 4,707,297 discloses a similar scheme using a removable (washable) fluorescent dye.

U.S. Pat. No. 6,076,227 (Shallig et al) teaches a surface type detector for detecting a type of surface to be treated, which surface type detector comprises a vibration detector. An acoustic pulse is transmitted towards the floor. The amplitude of the reflection at various angles of incidence from the floor surface is used to determine the type of floor. Similar to the teachings cited above, the Shallig et al. sensor must travel over the transition between floor types before the transition is detected. Likewise, optical detectors of detecting carpet versus hard surface floor types rely on the relative reflectivity of the surfaces. Optical detectors cannot reliably distinguish between patterned/textured hard surfaces and carpet.

Consequently, a need still exists for a system which can assist a mobile robot in avoiding obstructions. Particularly, a need exists for a system by which a mobile robot can distinguish between hard surface floors and carpeting or rugs

SUMMARY OF THE INVENTION

The present invention comprises an obstruction management system for a mobile robot. The system comprises a plow. The plow is attached to the robot at a proximal end and extends outwardly therefrom to a distal end. The plow has a forward face disposed in acute angular relationship relative to the floor or other support surface upon which the robot sits. The plow is movable relative to another predetermined component of the robot. Suitable components include the chassis, suspension, etc. of the robot. Such relative movement is detectable by sensors.

Upon encountering an obstruction, the plow will either push it aside, raise it in elevation by having the distal end of the plow slide under the obstruction or the plow will move relative to the other component of the robot. Any of these three situations will obviate immobility of the robot due to the obstruction.

If the obstruction is pushed aside, it will not impede forward movement of the robot. If the plow slides under the obstruction, it will move upwardly, and likely become closer to the robot. As the obstruction moves upwardly, it will reach an elevation where it is detectable by sensors on the robot. Upon detection by the sensors, the robot will change its direction, avoiding the obstruction. If the obstruction causes the plow to move relative to the other predetermined component of the robot, such relative movement is detected by the sensors. Again, the robot will change its direction, avoiding the obstruction.

In another embodiment, drag on the robot wheels or other floor contacting surfaces may be monitored to detect any differential friction which occurs when the robot encounters a difference in surface type. Such detection may be accomplished by measuring current to the drive motors, or wheel revolutions versus power to the drive motors. In another embodiment, differences in floor type may be detected by measuring the position or displacement of a cleaning sheet biased against the floor.

DETAILED DESCRIPTION OF THE INVENTION

Figure 1:
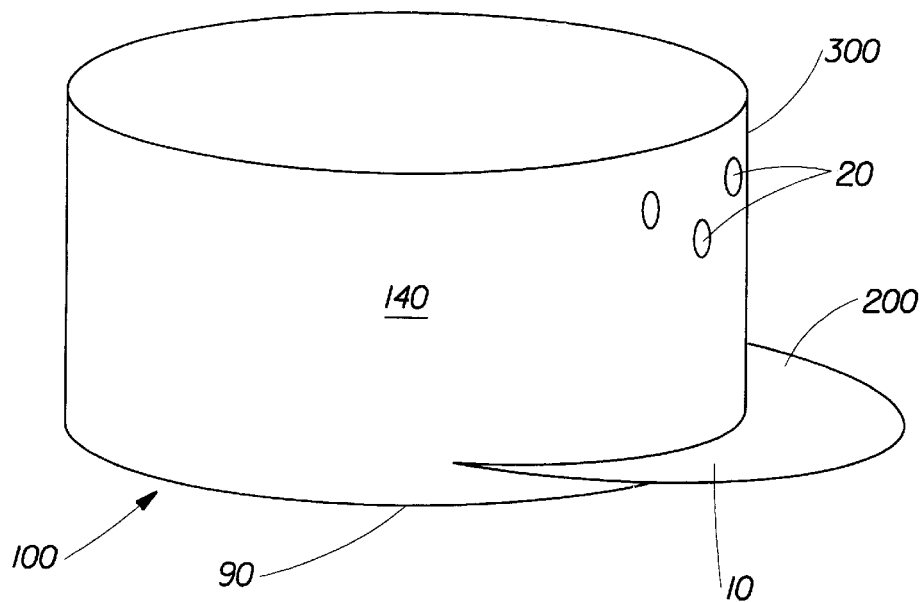
FIG. 1 is a schematic elevational view of an exemplary robot (100), suitable for floor maintenance and having a plow (10) and contacting or non-contacting sensors at locations (20) above the plow (10).
Figure 2:
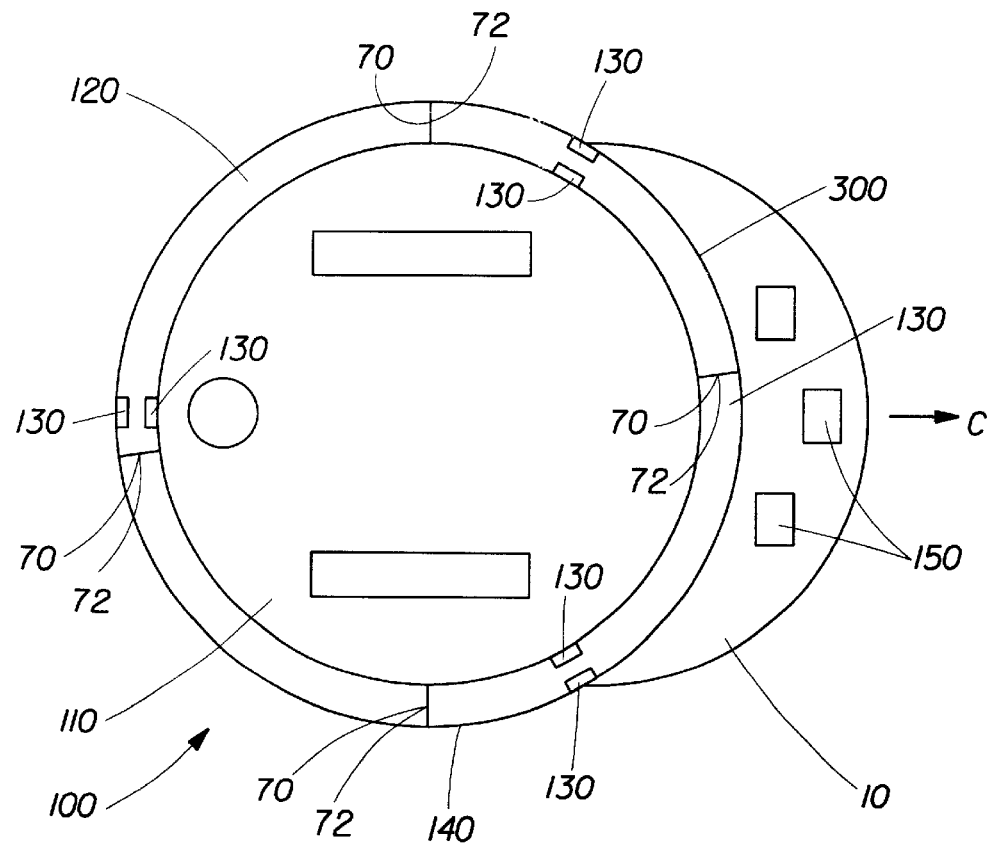
FIG. 2 is a bottom plan view of a floor maintenance robot depicting the powered chassis (110) an outer shell (140), and an annular clearance (120) between the powered chassis (110) and the outer case or shell (140). Plow (10) is attached to the outer shell (140). Also depicted on the underside of the plow (10) is a high friction carpet contacting element (150) and contact switches (130).

Referring to FIGS. 1–2, the present invention comprises a robot 100 useful for performing any of the tasks cited above, as well as several other tasks to which robots may be adapted. In a first execution the robot may an autonomous or remote controlled robot that comprises a chassis, a drive mechanism mounted to the chassis, optionally by a suspension, and shell movably mounted to the chassis. The optional suspension may include a resilient member interposed between the drive mechanism and the chassis so that when the shell is pushed toward the supporting surface with a predetermined force the resilient member compresses to permit the drive mechanism to move and the shell and/or the chassis to contact the supporting surface, such as a floor or table. The shell is the outer casing of the robot and may be of any aesthetically pleasing design, and encloses the contents of the robot, protecting them from dust, etc.

In a second execution the robot may comprise a chassis 110 having a plurality of elongate openings and a substantially rigid shell 140 movably attached to the chassis by a plurality of elongate elastic supports received in the plurality of elongate openings. This arrangement provides substantially unconstrained horizontal movement and vertically constrained movement of the shell relative to the chassis. This arrangement may be used in conjunction with a sensor having a passive portion attached to a central portion of the rigid shell and an active portion attached to the chassis.

In a third execution the robot comprises a chassis 110, a substantially rigid shell 140 movably attached to the chassis, and a non-skid lower edge member movably attached to the shell to adjustably provide a vertical clearance between the non-skid lower edge member 90 and the supporting surface. Preferably the clearance is greater than 0.8 cm. This clearance reduces the likelihood that the robot will be impeded in movement by small obstructions.

The instant invention comprises a system to detect obstructions and/or prevent immobilization by obstructions which may impede the mobility of the robot. Such obstructions include, but are not limited to, transitions from carpeted surfaces to hard surfaces, transitions from hard surfaces to carpeting and throw rugs or mats, objects which are too heavy to be moved by the robot, objects which deflect the movement of the robot from its intended path, and objects which prevent the robot from reaching a target location.

The system to manage loss of, deflection of, or unintended movement of the robot by such obstructions comprises a plow 10. The plow 10 comprises a forward surface 200 disposed in angular relationship, and particularly acute angular relationship, relative to the base of the robot. The base of the robot is the plane defined by the wheels or any three supports on which the robot rests.

Figure 1A:
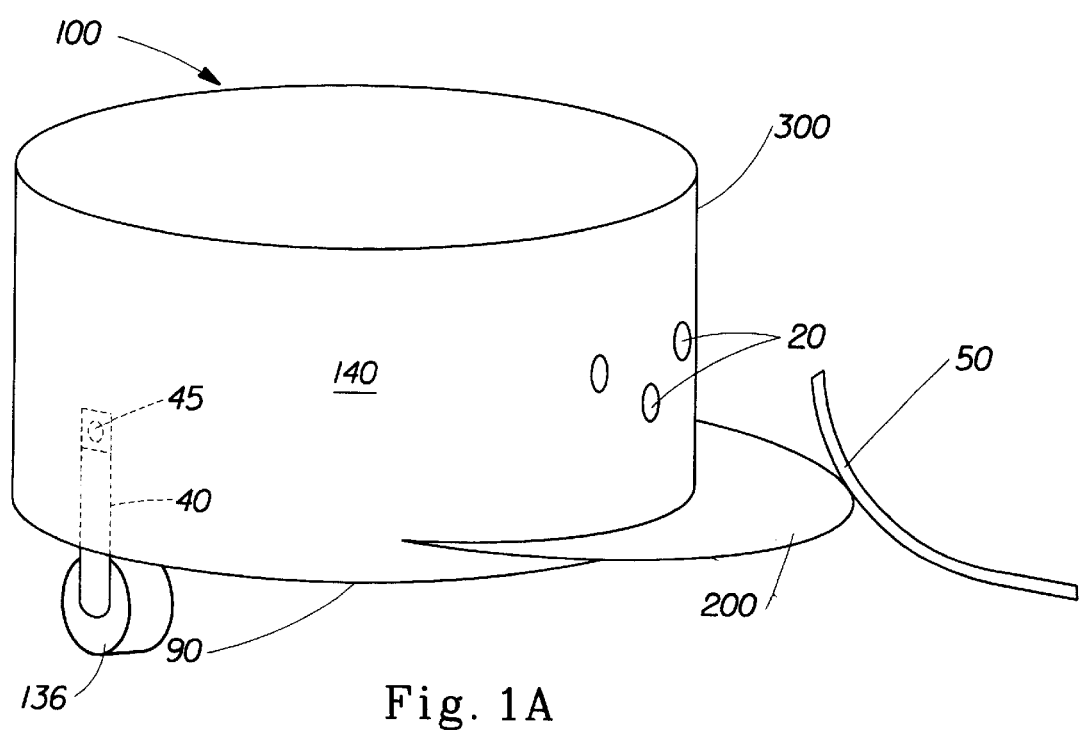
FIG. 1A is a fragmentary schematic elevational view of a floor maintenance robot (100) traveling to the right. The plow (10) is shown lifting carpet or other obstruction (50) up from the floor (60) toward the forward looking sensors at positions (20). The trailing wheel 136 in this embodiment is provided with an vertically adjustable support (40) in order to control the vertical distance between the plow (10) and the floor. An optional vibration sensor (45) is shown mounted on vertically adjustable support (40).

Referring to FIGS. 1A–2, when the robot is resting or moving on a floor or other support surface, the plow will be in angular relationship, and particularly acute angular relationship, relative to the horizontal plane. Typically, the forward face 200 of the plow will define an acute included angle between the floor and the forward face. The forward face of the plow may be flat in cross section, convex arcuate away from the center of the robot, or concave towards the center of the robot. If the forward face of the plow is flat, it may define an angle of 20 to 70 degrees in a first embodiment, 30 to 60 degrees in a second embodiment, and 45 degrees in a third embodiment relative to the base of the robot. The angular relationship is defined as the included angle between the forward face 200 of the plow 10 and a flat, horizontal support surface upon which the robot rests and is taken at the leading face 300 of the robot.

If a concave or convex plow is selected, it may have constant or variable radius of curvature throughout the arcuate cross section. For example, the plow may have a lesser radius of curvature at the leading face 300 of the robot than at positions circumferentially outboard of the leading face. Likewise, the radius of curvature of the plow may decrease as the elevation of the plow increases, or vice versa. The elevation or radial extent of the plow may increase as the leading face 300 of the robot is azimuthally approached. Likewise, the plow may have a chevron shape, with a vertex coincident the leading face of the robot.

The plow is disposed on at least the leading face of the robot. The plow is an inclined plane which may subtend at least 90, possibly at least 180, possibly at least 270 and in some executions 360 degrees of the periphery of the shell of the robot. If the plow does not circumscribe the robot, the plow may be azimuthally centered on the leading face of the robot. The leading face of the robot is that circumferential point of the robot which faces the forward direction of the robot. The forward direction is defined as the direction in which the robot is predominately oriented during rectilinear movement towards a target location. The robot may have a single forward direction if it has the same orientation during movement in all absolute directions or multiple forward directions if the robot has multi-axis mobility. The plow may be formed integral with or attachable to the shell 140.

Referring to FIG. 2 preferably, low lying elements of chassis 110 such as the motor-gearboxes are positioned substantially above the non-skid lower edge 90 of shell 20 so that autonomous robot 10 does not become trapped on obstructions which shell 20 passes over but which would then contact such low lying elements. Thus, no part of chassis 110 should be lower than nonskid lower edge 90 of shell 20, except for the wheels 136.

The bottom of the plow should have a minimal clearance from the floor or other support surface. A clearance of 1 to 10, and optionally less than 5 mm may be suitable. If the clearance is too small the plow will gather or brush aside small debris or trash intended to be cleaned by the robot. If the clearance is too large, the plow will pass over obstructions without intercepting them. Passing over the obstructions may permit the robot to become obstructed from further movement.

Figure 3:
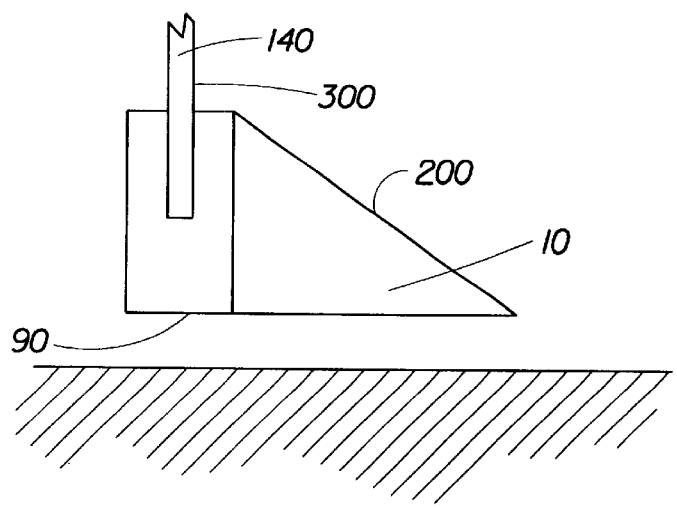
FIG. 3 depicts a cross-section of a vertically adjustable plow (140) and the outer shell (140).

Referring FIG. 3, the vertical clearance between the underside of shell 20 and the top of chassis 34 is preferably at least as great as the ground clearance between the nonskid lower edge member 22 and the floor or other surface 24, which as previously described with respect to FIG. 1 is preferably less than 0.8 cm.

Thus, the plow should either move the obstruction aside, or vertically displace it. Vertical displacement of the obstruction is most likely to occur when the obstruction is relatively large compared to the robot, e.g. comprises a rug or obstruction partially supported by the floor.

If the plow is vertically displaces the obstruction, it will ride up the forward face 300 of the plow, until the elevation of the obstruction, or portion thereof supported by the plow, reaches the elevation of the sensors at locations 20. At this elevation, the sensors detect the obstruction, and the robot automatically changes direction to move away from the obstruction. Optionally, the robot may remain at that position until removed by the user.

Shell 140 may be formed without external protrusions so that the robot can freely rotate while in contact with an obstruction. However, it may alternatively be desirable to attach one or more flexible brushes to autonomous robot 10 that protrude beyond the radius of shell 20 in order to sweep the floor.

FIG. 2 shows a preferred attachment mechanism 70 for movably attaching shell 20 to chassis 34, as well as a preferred sensor for sensing horizontal motion of shell 20 relative to chassis 34. Preferably, the sensor also senses compression or deflection of shell 140 toward chassis 110 such as when autonomous robot 10 is stepped upon. Although a preferred attachment mechanism and a preferred sensor are shown, modifications thereof as well as other types of attachment mechanisms and sensors may be used instead. Attachment mechanism 70 and sensor 90 are shown for the purpose of illustration, and the invention is not limited thereto.

The shell 140 may be movably attached to chassis 110 by two or more elastic supports 72 which may be, for example, springs, elastic rods, elastic tubes or the like, each received within an in the chassis. Preferably, elastic supports 72 are sufficiently compressible to collapse under vertical load. The bottom of each elastic support 72 is attached to chassis 34 and the top of each elastic support 72 is attached to shell 20. When shell 20 is brought into contact with an obstruction while moving horizontally, e.g., in the direction of arrow C, shell 20 is free to move in a nearly horizontal arc relative to chassis. The openings allow elastic supports 72 to be relatively long even though the overall height of autonomous robot 10 is preferably short to avoid counters that may overhang the floor. Preferably, the length of elastic supports 72 is at least one-half of the height of autonomous robot 10, and more preferably at least 75 percent of that height. The relatively long length of elastic supports 72 provides a substantially free, but vertically constrained, movement of shell 20 relative to chassis 34. This arrangement allows a strong, rigid shell 140 (that can be stepped upon without shattering) to be used rather than the thin, deformable covers of prior autonomous mobile cleaning devices.

Referring again to FIG. 2 sensor 130 senses horizontal motion of shell relative to chassis 110 or any other predetermined component of the robot. The sensor 130 may include a passive portion attached to the underside of shell 20. The term "passive" is used in the sense that no electrical conductors need to be routed to passive portion for it to operate. Locating passive portion of sensor 90 on shell 20 is advantageous in that no electrical conductors need be routed from chassis to shell 20. The passive portion may include a first or large conductive disk sandwiched between shell and a second or smaller conductive disk. The disks are attached to shell to be juxtaposed with one another.

The sensor 90 may also include an active portion attached to chassis 34. The term "active" is used in the sense that electrical conductors are routed to active portion for it to operate. The active portion of sensor 90 includes one or more, preferably three or more, electrical contact sensors arranged at equal angular intervals in a circle that is concentric with small conductive disk and large conductive disk when shell 20 is in its non-displaced position relative to chassis 110. Each electrical contact sensor 90 includes two electrical contacts separated by a gap. When shell 140 contacts an obstruction, shell 140 is displaced relative to chassis 110 in vector 180 degrees away from the contact point. The small conductive disk, which is displaced along with shell 140, travels over at least one of the electrical contact sensors 90. If displaced a sufficient amount, the small conductive disk activates at least one of the electrical contact sensors 90 by bridging the gap between the electrical contacts. Each of the electrical contact sensors 90 is operatively connected to a control module. The direction of the displacement of shell 20 is determined by control module based on which one (or ones) of the three or more electrical contact sensors 90 has (have) been activated. By determining the direction of the displacement, control module may, for example, rotate, or back and rotate, autonomous robot 10 away from the obstruction before proceeding forward again. Accordingly, autonomous robot 10 can reliably circumnavigate obstructions in its environment.

Sensor 90 preferably also senses displacement or compression of shell 20 toward chassis 110 such as when autonomous robot 10 is stepped upon. When shell 140 is forced vertically downward, the large conductive disk electrically bridges the gap between electrical contacts in all of the electrical contact sensors 100. Once control module determines this condition is present, control module may, for example, shut off the motors within the robot.

Alternatively, an optical sensor may be used for collision detection. An optical sensor may have a passive portion attached to shell 140 and an active portion is attached to chassis 110. The passive portion of optical sensor includes a reflective disk, which is attached to shell so as to be concentric relative to shell. The active portion of optical sensor includes an illumination source, such as an LED, and a plurality, optionally six, optical receiving sensors, such as photo diodes, arranged at equal angular intervals in a circle that is concentric with reflective disk when shell 140 is in its non-displaced position relative to chassis 110. Of course, more than one illumination source may alternatively be used. Likewise, more or less than six optical receiving sensors 118 may alternatively be used. For example, one or more source/sensor pairs may be used, i.e., each pair consisting of one illumination source and one optical receiving sensor. The illumination source and optical receiving sensors are mounted facing upward toward reflective disk. Preferably, reflective disk is mounted within a light barrier ring and illumination source is mounted within a light barrier ring, with light barrier rings spaced apart a distance to reduce light leakage preferably surrounds the optical receiving sensors 118 to reduce the introduction of stray light.

When shell is displaced horizontally relative the chassis, reflective disk is brought over one or more optical receiving sensors. Thus, when an obstruction displaces shell, light is transferred from illumination source to activate one or more optical receiving sensors via reflective disk. Each of the optical receiving sensors is operatively connected to control module. The direction of the displacement of shell is determined by control module based on which one (or ones) of the optical receiving sensors has (have) been activated. By determining the direction of the displacement, control module may, for example, rotate, or back and rotate, autonomous robot 100 away from the obstruction before proceeding forward again. Accordingly, autonomous robot 100 can reliably circumnavigate obstructions in its environment.

Robots suitable for use with the present invention are described in commonly assigned U.S. patent application Ser. Nos. 09/715,307 filed Nov. 17, 2000 in the names of Bartsch et al. and U.S. patent application Ser. No. 09/580,083 filed May 30, 2000 in the names of Kirkpatrick et al, both incorporated herein by reference.

Referring back to FIG. 1, a front view, the floor maintenance robot (100) is provided with a plow (10) and acoustic or optical proximity sensors at predetermined locations (20) which may be at various elevations above the support surface.

Referring to FIG. 1A, when the robot, traveling to the right, contacts an obstruction 50, such as a material edge such as carpet or some other fabric laying on a floor, the plow (10) acting much like a snow plow or locomotive cow catcher, lifts the material (50) from the floor (60) into the range of the forward looking acoustic or optical sensors (20). The vertical distance between the leading edge (10) and the floor (60) is adjustable by lowering or raising the trailing wheel (30) of the robot by means of a vertically adjustable support (40). The adjustment mechanism for the vertically adjustable support (40) can be a friction fit, a threaded rod and channel, a ratchet or similar means. Raising or lowering the trailing wheel acts to respectively lower or raise the plow relative to the floor (60).

In operation the forward looking acoustic (sonar) or optical sensors (IR) provide a signal to the microprocessor when an obstruction is being approached resulting in backing and rotation and travel away from the obstruction. In the event material is lifted, the same signal is provided producing the same reaction from the microprocessor control. If the sensors are of the ranging type (e.g. produce a signal proportional to the distance to an obstruction) the sudden occlusion of the sensor by a lifted material or carpet can be distinguished from the more gradual approach to an obstruction. In the preferred embodiment the plow is plow-shaped.

Referring to FIG. 2, a bottom view of the robot, a collision of the plow (10) with carpet or some other low lying obstruction moves the shell (140) which supports the plow (10) depressing one or more contact switches (130). It is to be understood that the shell (140) is free to move in a horizontal plane relative to the powered chassis (110) to the extent permitted by the annular clearance (120) between the shell (140) and the powered chassis (110). The closure of one or more contact switches (130) signals the microprocessor or other control module to rotate the robot away from the obstruction with which it has collided.

The plow (10) may be provided with a friction element (150) which may be an adhesive patch, small hooks, a small brush, or similar materials having high coefficient of friction on a carpet or rug but a relatively low coefficient of friction on a hard surface floor. The hooks may sold under the Velcro brand by Velcro USA, Inc. Manchester, N.H., or may be free formed prongs made according to the teachings of commonly assigned U.S. Pat. No. 5,116,563, issued to Thomas, U.S. Pat. No. 5,058,247 issued to Thomas et al, and U.S. Pat. No. 5,318,741 issued to Thomas, all incorporated herein by reference. The friction element (150) serves to catch on low lying carpet that the plow may have passed on to thereby activating the contact switches (130).

The cleaning means (not shown), typically a sheet holder bearing a mop (either wet or dry), dusting cloth, brush, or other cleaning implement may be permanently or removably attached to the robot. Attachment may be accomplished using any means known in the art, such as a channel (160) and rod (170). The rod 170 may be vertically oriented or have a vector component parallel to the vertical. If the cleaning element encounters a high friction surface such as carpet, the vertical rod (170) is forced to the back of the channel against the (spring loaded) contact switch (130) providing the microprocessor that a high-drag condition exists. It should be noted that the spring action (actuation force) of the contact switch (130) may be supplemented with other elastic means in the female channel (160).

Functionally, when the robot is moving a cleaning implement such as sheet holder and dusting sheet, a scrubbing brush, or damp mop, the drag of the cleaning implement will be much higher on a fabric surface such as carpet than on a hard surface floor. The increased drag imposes a rearward force on the vertical rod (170) which supports the cleaning implement causes the vertical rod to force the contact switch (130) positioned in the back of the channel closed signaling the microprocessor that high drag condition exists. Alternatively, the increased drag caused by the cleaning implement contacting carpet may be detected by monitoring the current draw of the propulsion motors by measuring the voltage drop across an electrically resistive element in series with the propulsion motors or motor.

Referring to FIGS. 1A–2, in the present invention, a vibration sensing transducer 130 such as a piezoelectric film or crystal or magnetostrictive element may be used to actively or passively detect surface type. Said element may be mounted on a support wheel support (40). In passive use the amplitude of the signal from the transducer is monitored for frequency and amplitude occurring from the contact of the wheel and the surface. The vibration (and signal) had from contact with carpet is differs from the vibration and signal from a hard floor. Generally, the content from a hard surface floor has high frequency (impact) content. Referring to the '227 patent it can be seen that in active use, the wheel support, rather than air is the medium used to conduct vibrations to and from the floor. This has the advantage of allowing passive monitoring of vibrations occurring as a consequence of the wheel traveling over a surface and doing away with the power losses inherent in air-to-solid acoustic interfaces thereby permitting both higher and lower vibration frequencies to used at lower power levels. Alternatively, rather than a wheel, any solid form such as a knob or spherical body contacting the surface on which the robot is traveling may be used as the vibration conduction means. Such sensing means may be advantageously placed under and attached to the plow (10) of the robot. It can further be seen that a sensor in this location can also be used to detect drop-offs as a consequence of an absence of passive vibration (and modification of the active return signal) allowing the robot to be rotated away from drop-offs such as stairs.

An alternative embodiment, an extended plow (10) is in the form of a ring which extends entirely around and circumscribes the robot (100) where the extended plow is vertically adjustable relative to the robot's shell (140) and thereby the floor surface.

Referring to FIG. 3, an alternative embodiment, the plow (10) is shown in cross section with the robot's shell, depicting a friction fit allowing vertical movement of the plow (10) relative the robot's shell (140). This arrangement allows the plow to be lowered relative to the operating surface or raised depending on the clearance above the surface needed to collide with articles such as carpets just above the hard surface floor but not contacting ridges, grout lines, or other raised, or vertically non-uniform features of the hard surface floor.

Although particular versions and embodiments of the present invention have been shown and described, various modifications can be made to the system without departing from the teachings of the present invention. The terms used in describing the invention are used in their descriptive sense and not as terms of limitation, it being intended that all equivalents thereof be included within the scope of the claims.

What is claimed is:

1. A mobile robot, the robot comprising a chassis and a plow flexibly attached to the chassis; an annular clearance being provided between the plow and the chassis; a sensor to detect changes in said clearance resulting from collisions between obstructions and the plow.

2. A robot according to claim 1 wherein said robot changes direction in response to detecting a change in said clearance.

3. The robot of claim 2 wherein the plow is vertically adjustable on the robot.

4. A robot according to claim 1 wherein the surface transition detection system comprises an attachment rod inserted in a channel, the channel is provided with a spring-loaded contact switch to detect displacement of said rod.

5. A robot according to claim 4 wherein said rod is substantially horizontal while robot is in motion.

6. A mobile robot having a surface transition detection system, the robot comprising a chassis and a plow flexibly attached to the chassis; an annular clearance being provided between the plow and the chassis; a sensor to detect changes in said clearance resulting from collisions between obstructions and the plow, said robot having at least one floor contacting element wherein the surface transition detection system comprises a vibration sensor mounted on a surface contacting element of the robot.

7. A mobile robot having a surface transition detection system, the robot comprising a chassis and a plow flexibly attached to the chassis; an annular clearance being provided between the plow and the chassis; a sensor to detect changes in said clearance resulting from collisions between obstructions and the plow, said robot having a shell pivotally mounted on said chassis.

8. A surface transition detection system for a mobile robot, said system comprising a plow and acoustic and/or optical sensors positioned above the plow to detect material lifted in front of the sensor by the plow while the robot is in motion.

9. An obstruction management system for a mobile robot having a periphery and a leading face and being disposable on a support surface, said system comprising a plow juxtaposed with said leading face and extending outwardly from the periphery of said robot, said plow being disposed in acute angular relationship relative to said support surface.

10. A system according to claim 9 wherein said plow has a clearance from said support surface of less than 10 mm.

11. A system according to claim 9 further comprising a sensor disposed at an elevation above said plow, said sensor detecting obstructions intercepted by said plow and lifted to said elevation.

12. A system according to claim 9 wherein said plow has a forward face, said forward face forming an angle of 30 to 60 degrees relative to said support surface.

13. A system according to claim 9 wherein said plow has chevron shape with a vertex.

14. A system according to claim 9 wherein said plow subtends an angle of at least 90 degrees.

15. A system according to claim 14 wherein said plow subtends an angle of 360 degrees.

16. A system according to claim 15 wherein said plow is concave.

* * * * *